United States Patent
Jarrett

(10) Patent No.: US 6,950,674 B2
(45) Date of Patent: Sep. 27, 2005

(54) MULTI-PURPOSE MOBILE CORDLESS PHONE SYSTEM

(75) Inventor: Phillip Jarrett, Bramhall (GB)

(73) Assignee: Polutek Limited, Bramhall (GB)

( * ) Notice: Subject to any disclaimer, the term of this patent is extended or adjusted under 35 U.S.C. 154(b) by 468 days.

(21) Appl. No.: 09/765,308

(22) Filed: Jan. 22, 2001

(65) Prior Publication Data

US 2001/0031645 A1 Oct. 18, 2001

(30) Foreign Application Priority Data

Jan. 27, 2000 (GB) .............................................. 0001754
Aug. 7, 2000 (GB) .............................................. 0019189
Sep. 21, 2000 (GB) ............................................. 0023256
Oct. 5, 2000 (GB) .............................................. 0024341

(51) Int. Cl.$^7$ ............................................. H04Q 7/20
(52) U.S. Cl. ................................ 455/552.1; 455/426.2; 455/554.1; 455/11.1; 370/310
(58) Field of Search ......................... 455/552.1, 426.2, 455/426.1, 428, 550.1, 575.1, 344, 346, 347, 348, 462, 554.2, 463, 464, 465, 11.1, 556.1, 554.1, 556.2, 561, 425, 424, 74.1, 74, 401, 403, 509.1, 525, 67.11, 417, 67.13, 553.1, 435.2, 436, 443, 452.2, 41.2, 63.1, 426, 550, 384, 4.1, 7, 34.1, 13.1, 534.1, 573, 557, 155, 572, 457; 379/130, 113, 428.01, 16, 433.05, 93.09, 420.04, 428.04; 370/324, 337, 356, 350, 371, 316, 351, 210.01, 252, 386, 401, 418

(56) References Cited

U.S. PATENT DOCUMENTS

| 5,243,641 | A | * | 9/1993 | Evans et al. ................... 379/61 |
| 5,365,573 | A | * | 11/1994 | Sakamoto et al. ............. 379/61 |
| 5,797,089 | A | * | 8/1998 | Nguyen ....................... 455/403 |
| 5,799,068 | A | * | 8/1998 | Kikinis et al. ............ 379/93.06 |
| 5,983,098 | A | * | 11/1999 | Gerszbert et al. ........... 455/426 |
| 6,192,231 | B1 | * | 2/2001 | Chapman et al. ........... 455/401 |
| 6,201,951 | B1 | * | 3/2001 | Duwaer et al. ............ 455/74.1 |
| 6,266,539 | B1 | * | 7/2001 | Pardo ......................... 455/556 |
| 6,304,560 | B1 | * | 10/2001 | Archambaud et al. ...... 370/324 |
| 6,335,753 | B1 | * | 1/2002 | McDonald ................... 348/14 |
| 2002/0011993 | A1 | * | 1/2002 | Lui et al. .................... 345/179 |

* cited by examiner

Primary Examiner—Edward F. Urban
Assistant Examiner—Charles Chow

(57) ABSTRACT

A cordless phone 1 is able to communicate signals 3 via antenna 2 and 3 with transponder unit 5. When the transponder 5 is physically connected (as shown) via multi-way connector 12 to base station 19, the system communicates via PSTN interface 9 and cable 10 connected to local-loop socket 11 within a fixed telephone network. When the transponder 5 is disconnected (not shown) from base station 19, the system communicates via external antenna 6 by radio link with a local base station within a cellular phone network. The base station 19 provides means to recharge the batteries (not shown) of cordless phone 1 via connectors 13 and transponder unit 5 via connectors 14, with dc supply being provided by power plug 16 via cable 17. The transponder unit may include a display screen and PDA electronics (not shown), or, be incorporated within a portable computer (not shown).

8 Claims, 16 Drawing Sheets

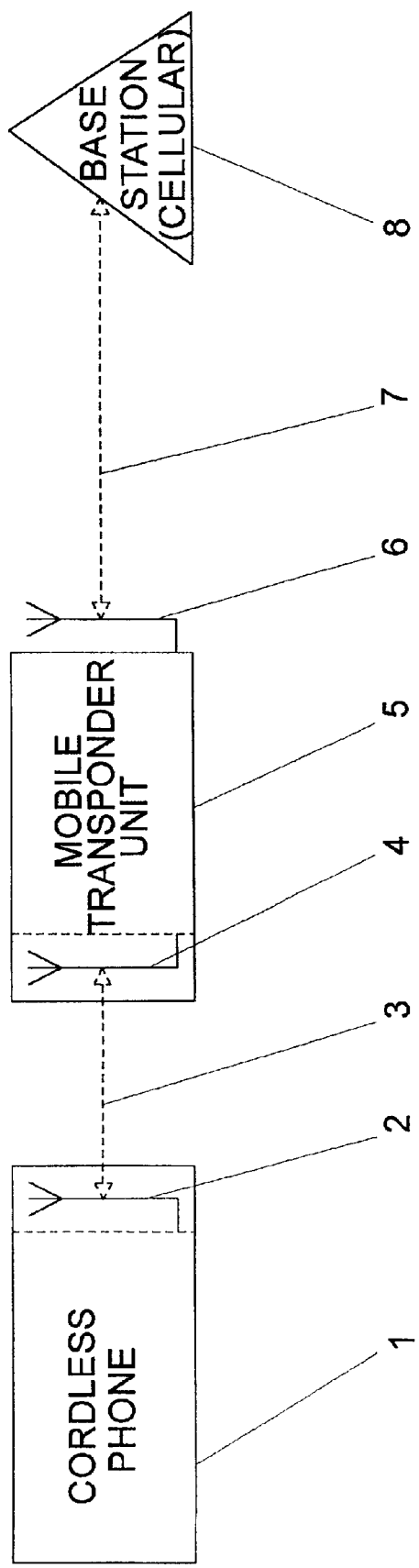
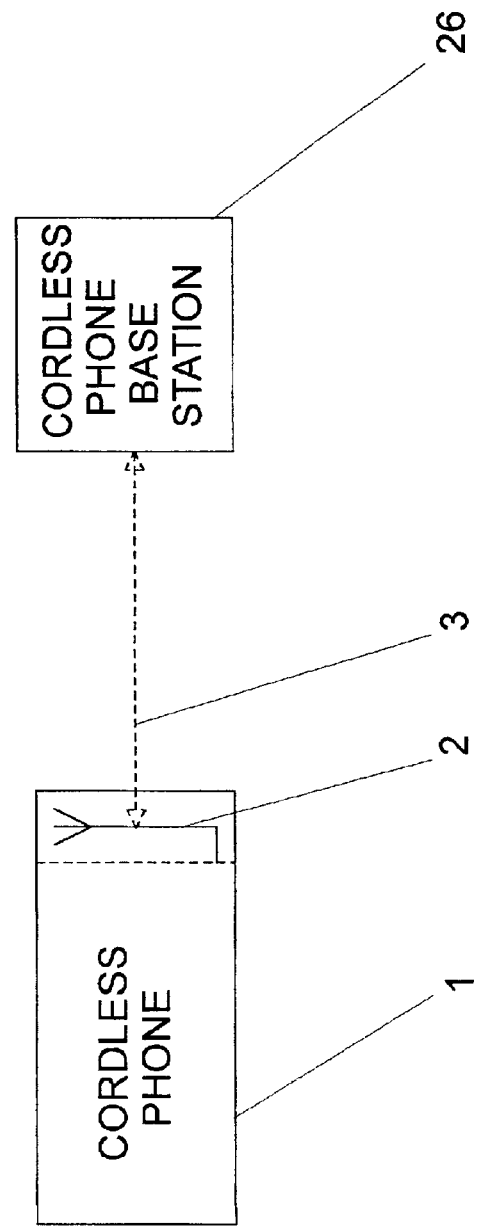
Fig 1a
Fig 1b

MULTI-PURPOSE MOBILE CORDLESS PHONE SYSTEM

CROSS REFERENCE TO RELATED APPLICATIONS

GB 0001754.1 filed in the UK on 27 Jan. 2000
GB 0019189.0 filed in the UK on 7 Aug. 2000
GB 0023256.1 filed in the UK on 21 Sep. 2000
GB 0024341.0 filed in the UK on 5 Oct. 2000

STATEMENT REGARDING FEDERALLY SPONSORED RESEARCH AND DEVELOPMENT

Not Applicable

BACKGROUND TO THE INVENTION

The present invention relates to a multi-purpose mobile cordless phone system, including means to allow a cordless phone to selectively communicate either via a local base station of a cellular phone network or via a local-loop connection of a fixed telephone network.

Throughout the following description and claims, the words "mobile phone" and "cordless phone" are used as generic terms for any compact portable device (for example, handheld phones, wrist phones, wearable phones incorporated into clothing) suitable for personal communication of voice/sound, data and/or visual image signals via a radio link.

It is well known that both mobile and cordless phones communicate via radio links, the former with a cellular phone network and the latter with a fixed telephone network. Given a typical cordless phone is used inside and within the close vicinity of a building, it has an adequate operational range measured in tens of meters, with a normal maximum outdoor range of 100–300 meters. On the other hand, a mobile phone may be used anywhere within any cell of a cellular network and thus needs to have an operational range of up to several kilometers. It is also known that the transmission power required for radio signals approximately follows the Inverse Square Law and thus the power output of a cordless phone is typically a few percent of the maximum power output of a mobile phone.

Due to the relatively high power output of mobile phones and their frequent close proximity to the body when being used, particularly during voice communication, various concerns have been expressed by others alleging potentially adverse health effects due to the use of mobile phones. As a result, it has previously been proposed that means be provided to allow a low-power cordless handset to communicate with a local base station of a cellular network via a high-power mobile transponder unit. For example, Bucalo et al (U.S. Pat. No. 5,444,778) proposed the transponder unit be incorporated within a briefcase. In fact, there are various other low radiation options available to the user for storage of the mobile transponder unit: for example, in a hand/shoulder bag, in a loose fitting jacket pocket, or, even located on a belt clip (if the transponder unit incorporates a suitable personal radiation shield).

Although the prior art communication system has the potential to overcome possible health concerns of the user, the necessary components represent a significant cost increase when compared to a stand-alone mobile phone, given it is necessary to provide the user with a cordless phone handset plus a mobile transponder unit. In view of this, the described prior art system has so far not been made available on a commercial basis.

Grant (GB 2340691) describes conventional cordless phone technology being used for communication between the cordless phone handset and the transponder unit, the cordless phone handset alternatively communicating with a fixed telephone network if a cordless phone base station is included within the system. However, in the system proposed by Grant, the handset (and/or transponder unit) and the base station form the components of a conventional cordless phone system. In other words, the base station has to incorporate a radio transceiver for communication with the handset (in addition to a suitable fixed telephone network interface).

BRIEF SUMMARY OF INVENTION

According to the present invention, a mobile transponder unit can be physically connected to a base station and, hence, it is not necessary for the latter to incorporate a radio transceiver. In other words, the system includes similar functionality to typical stand-alone mobile and cordless phone systems but at a comparable overall cost. In view of this, one objective of the multi-purpose mobile cordless phone system is to provide low cost means for communication between the mobile transponder unit and a local-loop connection of a fixed telephone network.

Most mobile and cordless phones are powered by rechargeable batteries and thus a second objective of the multi-purpose mobile cordless phone system is to provide a charger for the respective battery packs of the cordless phone and the mobile transponder unit.

Cellular networks do not normally cover the entire population of a given country, namely, all geographical regions are seldom covered. Hence, a third objective of the multi-purpose mobile cordless phone system is to provide portable means for communication via a fixed telephone network within areas of poor reception for cellular networks.

The provision of a single personal contact telephone number is desirable for use by both private individuals and small businesses. However, the only fully automatic diversion option presently available to the latter involves the provision of a personal contact number via a telecom service provider, which thus normally attracts a premium rate charge. In view of this, a fourth objective is to provide a multi-purpose mobile cordless phone system having simple automatic means to divert incoming calls made to a user designated number.

A typical local-loop landline connection provides the user with a bandwidth of 32–64 kbit/s, which compares to current Second Generation (2G) cellular network connections as low as 9 kbit/s. Even allowing for the 3G cellular network developments which are underway, due to both technical and commercial factors, a fixed telephone network is still likely to provide the user with a more consistent higher bandwidth signal at a lower tariff rate (cost/kbit basis). For these reasons, although the trend towards mobile communication continues to increase at an exponential rate, when at home or in an office, the use of a fixed telephone network is likely to remain preferable for the foreseeable future.

The planned 3G cellular networks will allow the mobile user to receive more complex visual images and 2G mobile phones are already available with built in Internet browsers (based on Wireless Application Protocol, WAP) allowing mobile access to various specially designed web sites. In view of this, a fifth objective of the multi-purpose mobile cordless phone system is to provide space for a significantly larger visual image display screen.

The technology is now available for the widespread provision of high bandwidth local-loop connections of 1–2 Mbit/s using the existing copper telephone wires. This significantly exceeds recent projections for 3G cellular networks and, hence, a landline connection of this type is preferable for Internet access purposes. Given the increasing convergence of computer and telecommunications technology, a sixth objective is to allow space within the multi-purpose mobile cordless phone system for the integral inclusion of computer electronics. The latter can provide the functionality associated with available types of Personal Digital Assistant (PDA) and, during Internet access, the mobile transponder unit may be physically connected to a high bandwidth local-loop.

Most mobile phones of the handheld type have a small keypad, due to around half the available area having been allocated to the display screen. The keypad is thus primarily suitable for numeric data entry, again, due to its compressed size. A seventh objective of the multi-purpose mobile cordless phone system is thus to provide means for inclusion of a QWERTY keyboard of a size at least comparable with the more advanced types of electronic PDA.

The inclusion of an enhanced image display screen, PDA electronics and a QWERTY keyboard within the multi-purpose mobile cordless phone system make the latter suitable for use within a Local Area Network (LAN). Under these circumstances, the physical connection of the mobile transponder unit to a LAN interface can provide an even higher bandwidth of 10–100 Mbit/s (for example, when the Ethernet bus is used) for visual image signals. On the other hand, if the QWERTY keyboard is incorporated within the cordless phone, signals can pass to the transponder unit at a more than adequate rate by using a Bluetooth radio link (less than 1 Mbit/s). An eight objective of the present invention is thus to provide a low cost client for a LAN server.

Many users of mobile phones have a portable computer, which can optionally be used for Internet communication when on the move. A ninth objective of the multi-purpose mobile cordless phone system is thus to provide means for inclusion of the mobile transponder unit within a portable computer.

In summary, the ability to physically connect a mobile transponder unit of the multi-purpose mobile cordless phone system to a base station obviates the need for an additional radio transceiver and has the further key advantage of providing a substantially higher bandwidth than a radio link. In view of the latter, the system can effectively benefit from 1–2 Mbit/s local-loop technology as well as 10–100 Mbit/s LAN access. The physical connection also provides convenient means of recharging the battery of the mobile transponder unit.

BRIEF DESCRIPTION OF THE SEVERAL VIEWS OF THE DRAWINGS

Some specific embodiments of the present invention will now be described, as examples, with reference to the accompanying drawings:

FIGS. 1a and 1b show the block diagrams of a typical prior art system, where the cordless phone is able to communicate via the mobile transponder unit with a local base station of a cellular phone network (FIG. 1a) and can alternatively communicate via a radio link with a cordless phone base station (FIG. 1b);

DETAILED DESCRIPTION OF THE INVENTION

Figure 2:
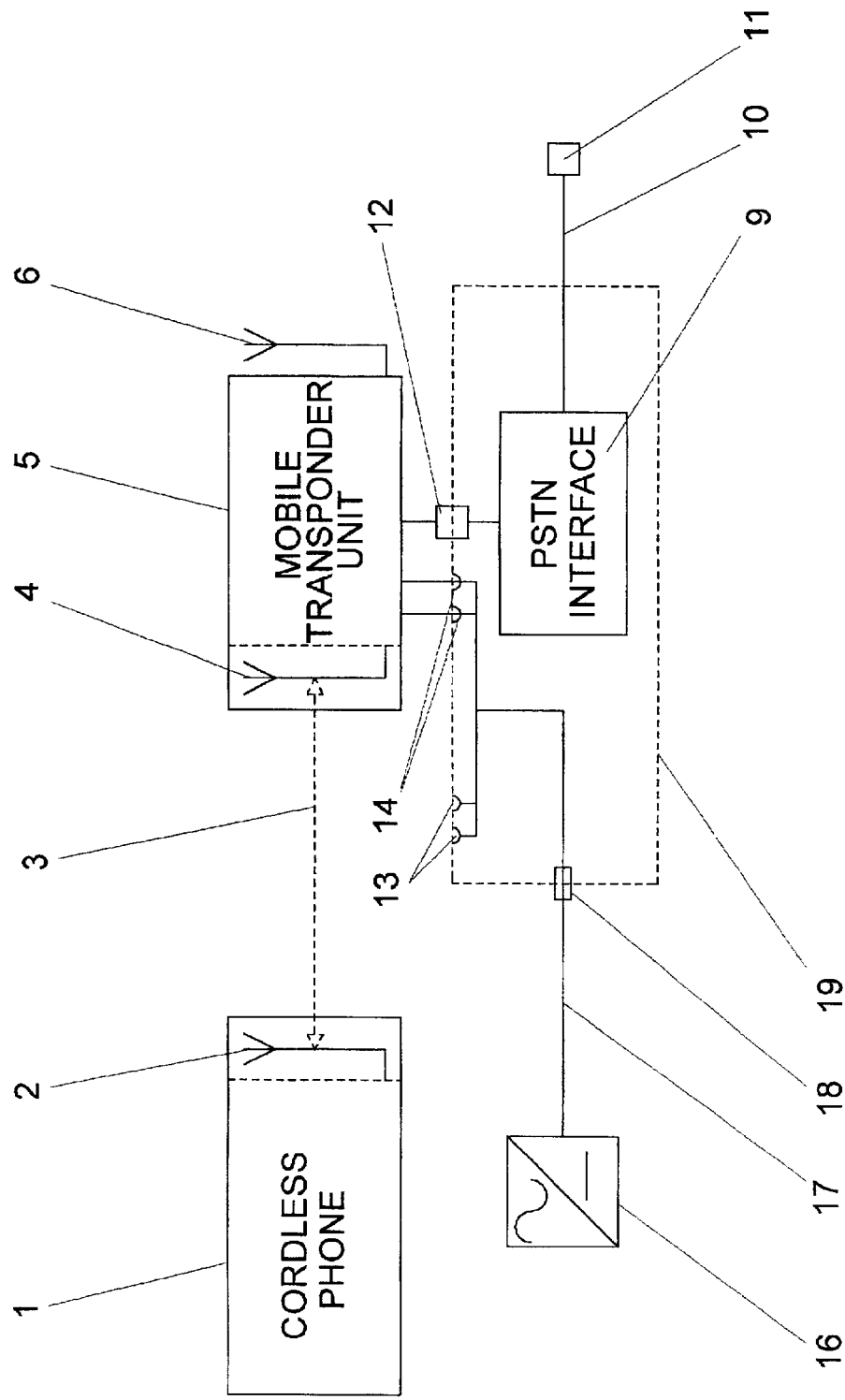
FIG. 2 shows the block diagram of one embodiment of the present invention, where the cordless phone is able to communicate with a simple cordless phone base station when the mobile transponder unit is physically connected to the latter.

Referring to the prior art shown in FIG. 1a, a cordless phone 1 transmits and receives via internal antenna 2, passing low powered signals 3 to and from the mobile transponder unit 5 via internal antenna 4. On the other hand, the mobile transponder unit 5 communicates with a cellular network base station 8 via external antenna 6, transmitting and receiving the high powered signals 7.

Referring to FIG. 1b, the cordless phone 1 can alternatively transmit and receive via internal antenna 2, passing low power signals 3 to and from a cordless phone base station 26. The phone 1 and transponder 5 incorporate existing cordless and mobile phone technology, each powered by their respective rechargeable battery packs. For example, phone 1 uses technology based on the DECT cordless phone standard to communicate with transponder 5 or selectively communicate with cordless phone base station 26. On the other hand, the transponder 5 might incorporate technology based on the widely used GSM mobile phone standard to communicate with the cellular base station 8. In Europe, GSM networks make use of the 900 MHz and/or 1800 MHz frequency bands; whereas, in North America, the 1900 MHz frequency band is often employed.

A normal cordless phone based on DECT technology has an indoor range of 10–50 meters and an outdoor range of up to 300 meters, which involves a higher power level for communication signal 3 (in FIGS. 1a and 1b) than is strictly necessary to realise a practical embodiment of the prior art. For example, an indoor radio signal range of say 10 meters would be adequate for most applications, which is the typically range provided by the Bluetooth Specification for wireless communications (operating in the ISM band at 2.4 GHz). Bluetooth is already used by at least one mobile phone manufacturer to communicate with a hands free microphone headset, providing Bluetooth/GSM communication via existing technology.

For cordless phones, the DECT (Digital Enhanced Cordless Telephony) standard is widely used within Europe; whereas, the PWT (Personal Wireless Telephony) standard is commonly used in North America. Similarly, the GSM digital radio technology standard is widely used within European cellular network; whereas other standards, such as CDMA One and WCDMA are commonly used in North America; in Japan, the PDC standard is used for mobile phones.

In addition to the foregoing optional digital standards, analogue embodiments of the prior art are also possible, for example, based on the AMPS, ETACS, or, NMT standards which remain in use in some geographical areas of the world.

At the present time, new network infrastructures and handsets based on so-called Third Generation (3G) systems are being developed to provide enhanced (wider bandwidth) communication within cellular networks. Wireless technologies such as EDGE and GPRS followed by the evolution of UMTS thus provide further options for future inclusion within the described prior art system.

Referring to FIG. 2, the cordless phone 1 again transmits and receives via internal antenna 2, passing low powered signals 3 to and from the mobile transponder unit 5 via internal antenna 4. However, instead of communicating via a cellular network base station, the mobile transponder unit has been inserted into its docking station (comprising items 12 and 14) within the simple cordless phone base station 19. The mobile transponder unit 5 is thus physically connected via multi-way connector 12 to the PSTN interface 9 and thus the transponder unit 5 forms a key working component of the base station 19. The signals 3 pass via transponder 5 through the PSTN interface 9 and multi-core cable 10 connected to local-loop socket 11 and hence via a fixed telephone network.

Combining the prior art embodiment shown in FIG. 1a and the present invention embodiment shown in FIG. 2, the multi-purpose mobile cordless phone system described thus allows the user to select either communication route according to the physical location of mobile transponder unit 5.

Referring again to FIG. 2, cordless phone 1 and mobile transponder 5 are separately powered by rechargeable battery packs (not shown). The batteries may be charged using a small portable transformer/rectifier similar to the type commonly provided for the re-charging of existing commercially available mobile phones. The latter is contained within the power plug 16 passing a dc supply via twin-core cable 17 and connector 18 inserted into the cordless phone base station 19. If the battery packs of the cordless phone 1 and the mobile transponder unit 5 are of the same type and voltage, they may simply be connected in parallel across the transformer/rectifier dc output via their respective connectors 13 and 14.

The above battery charging arrangement has the advantage that the transformer/rectifier power plug 16 plus its twin-core dc supply cable 17 can optionally be unplugged from base station 19. The power plug 16 can then be used for mobile recharging of the battery packs of cordless phone 1 and transponder unit 5, for example, via a set of flexible parallel connection leads (not shown).

The transponder unit 5 can determine if it has been inserted into the base station 19 by, for example, detecting the fixed telephone network voltage via multi-way connector 12, when cable 10 has been connected to a local-loop socket 11. If the fixed telephone network voltage is detected, then any outgoing calls pass via multi-way connector 12 via PSTN interface 9; on the other hand, if the mobile transponder unit 5 does not detect its physical connection to base station 19, then the signals pass via antenna 6.

When the mobile transponder 5 is physically connected to PSTN interface 9 and, if the local-loop telephone number has been user pre-programmed, the latter will advise via antenna 6 the Cellular Network Control Centre to automatically divert (subject to network provision) any incoming calls (made to the cellular network number of transponder unit 5) to the user pre-programmed local-loop telephone number of socket 11.

Figure 3:
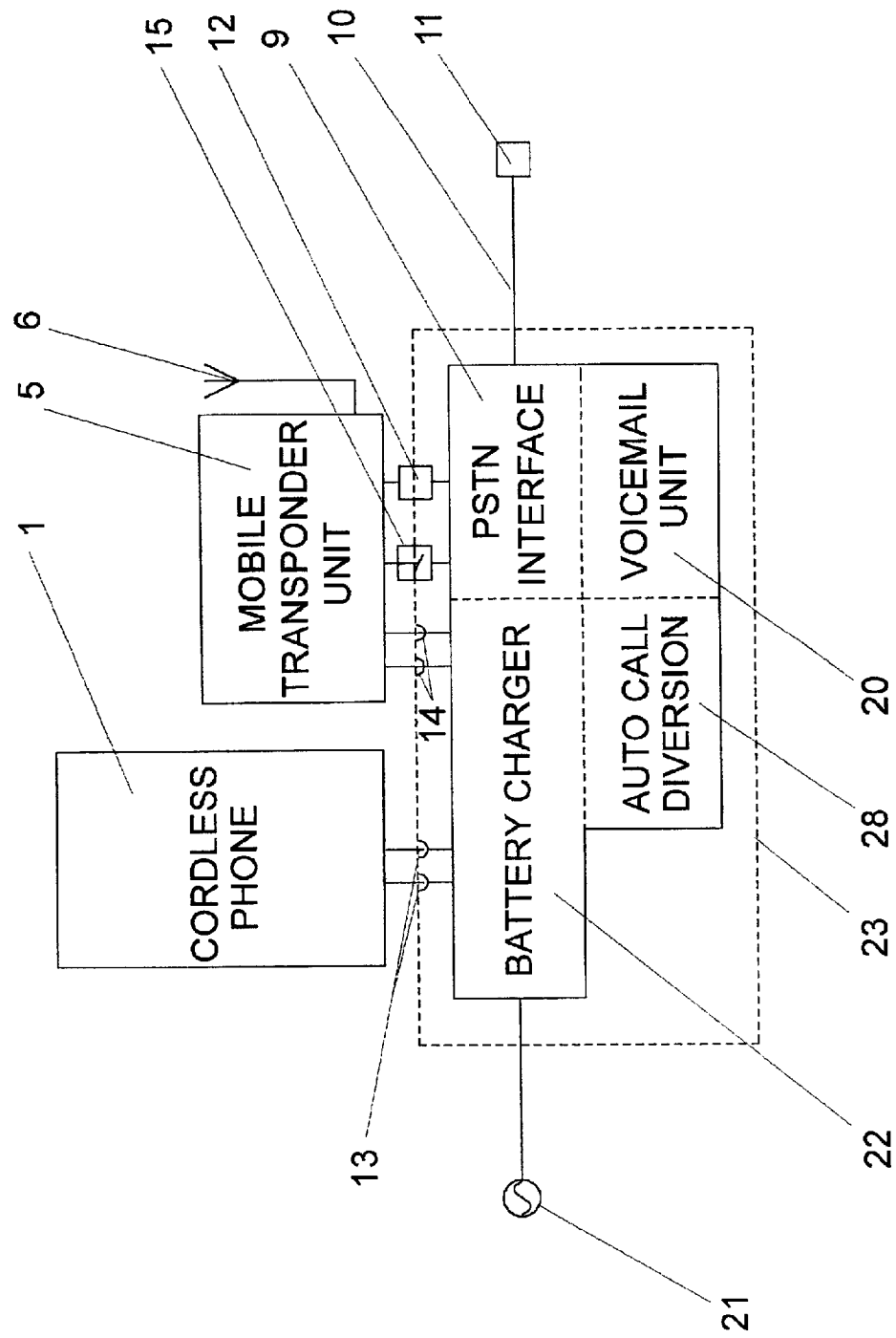
FIG. 3 shows the block diagram of a second embodiment of the present invention, where the charger, for the respective battery packs of the cordless phone and the mobile transponder unit, is incorporated within a cordless phone base station, along with an automatic call diversion facility and voicemail unit.

Referring to FIG. 3, battery charger 22 is connected to ac power supply 21 and is shown recharging the respective battery packs (not shown) associated with cordless phone 1 and mobile transponder unit 5. The battery charger 22 incorporates a transformer/rectifier power supply (not shown) providing appropriate dc output for the respective battery packs via connectors 13 and 14. The battery charger 22 contained within base station 23 may provide separate dc outputs for cordless phone 1 and mobile transponder unit 5, via the provision of multiple secondary "taps" on the transformer (not shown) and hence phone 1 and transponder 5 can be fitted with different voltage batteries.

Referring again to FIG. 2, the above described multi-voltage dc power supply can also be made available with a removable power plug 16, if item 17 comprises 4-core cable.

Referring again to FIG. 3, the voicemail unit 20 shown connected to PSTN interface 9 is powered by the battery charger 22. The voicemail unit 20 will thus respond to any unanswered incoming calls via local-loop socket 11, after the user pre-set number of rings.

FIG. 3 also shows a microswitch 15 which allows the base station 23 to detect when the mobile transponder 5 has been removed from its docking station (comprising items 12, 14 and 15). To avoid the possibility of accidental activation or de-activation (of the later described automatic phone divert), the detection circuit associated with microswitch 15 can have a time delay of say 5–10 seconds. In this way, the system will not respond to short period tampering with microswitch 15 of a few seconds only. For reasons of clarity, microswitch 15 is shown in direct contact with transponder unit 5. However, the charger connection 14 may be spring-loaded (similar to a convention cordless phone base station) and thus the microswitch 15 can be associated with item 14.

Under these circumstances, the base station 23 can be user pre-programmed (via auto call diversion facility 28) to automatically divert incoming calls (subject to network provision) made to the local-loop telephone number to the cellular network number of the transponder unit 5, when the latter has been disconnected from base station 19. In this way, the described multi-purpose mobile cordless phone system provides the facility for a single personal contact telephone number, namely, the cellular network number of the mobile transponder unit 5, or, preferably the fixed network number of the cordless phone base station 23.

Figure 4:
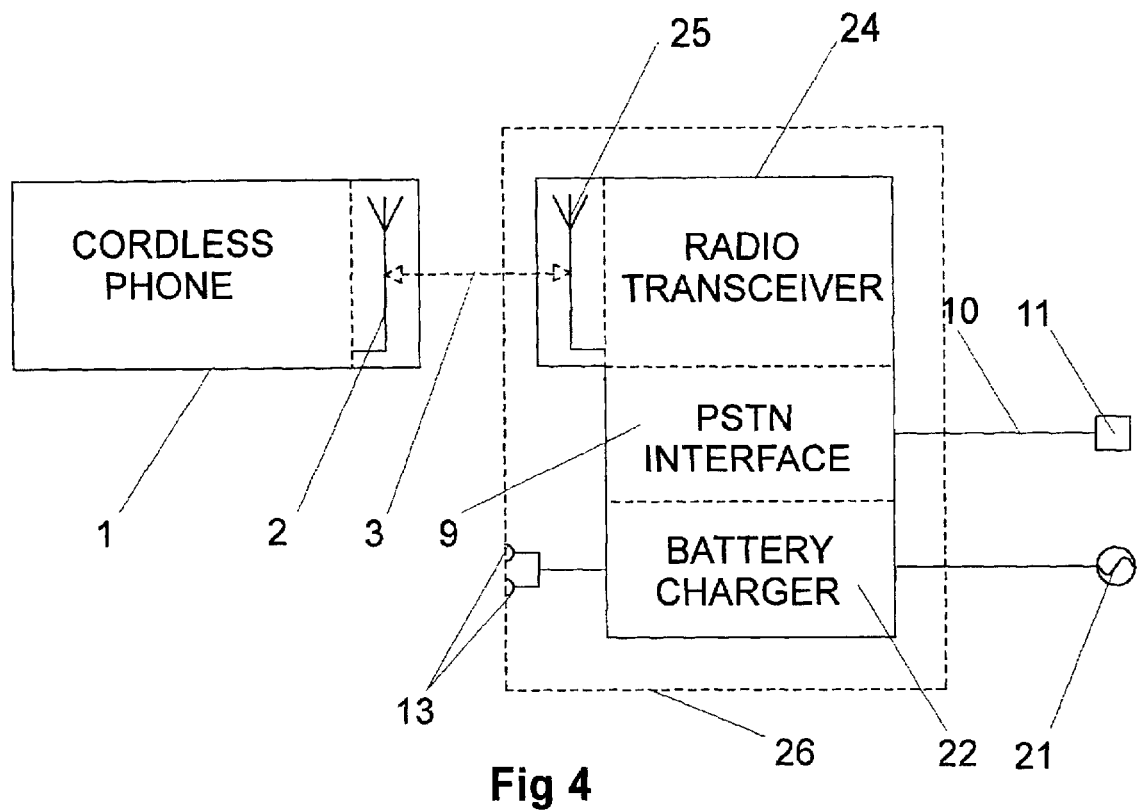
FIG. 4 shows the block diagram of a typical commercially available stand-alone cordless phone system, when the cordless phone is in radio communication with the cordless base station.

Referring to prior art FIG. 4, the cordless phone base station 26 comprises radio transceiver 24 having internal antenna 25, PSTN interface 9 and charger 22 for re-charging the battery pack of cordless phone 1 via connectors 13, during periods when the cordless phone 1 is in physical contact (not shown) with base station 26. Instead, the cordless phone 1 is shown as communicating via internal antenna 2, signals 3 with the cordless phone base station 26.

Figure 5:
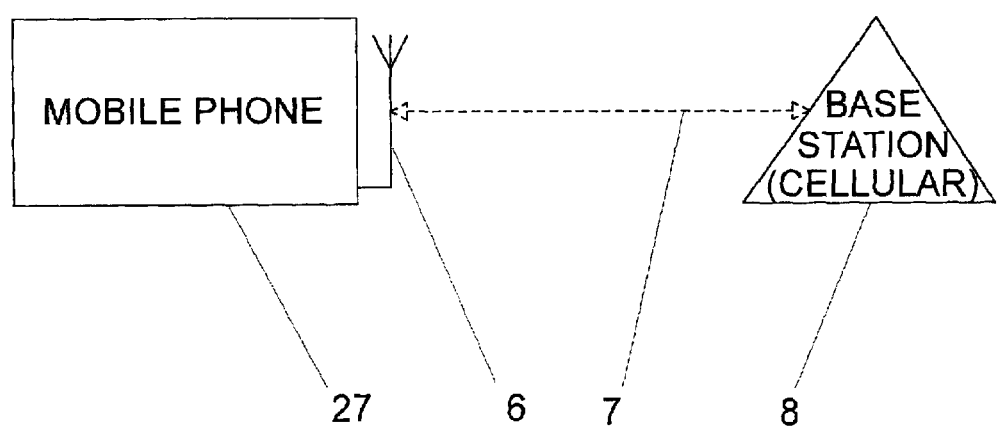
FIG. 5 shows the block diagram of a typical commercially available stand-alone mobile phone system, the mobile phone communicating with a local base station within a cellular network.

Referring to prior art FIG. 5, the mobile phone 27 communicates via external antenna 6, signals 7 with a cellular base station 8.

Referring to FIG. 4 and FIG. 5 and comparing the various components with the first described embodiment shown in FIG. 2, it will be noted that radio transceiver 24 having antenna 25 (FIG. 4) plus mobile phone 27 having antenna 28 (FIG. 5) are essentially of similar complexity and hence cost as mobile transponder unit 5 having antennae 4 and 6 (FIG. 2). On the other hand, cordless phone 1 having antenna 2 and the PSTN interface 9 (FIGS. 2 and 4) represent the same block diagram components; whereas, power plug charger 16 (FIG. 2) approximately equates to battery charger 22 (FIG. 4). In other words, the multi-purpose mobile cordless phone system (shown in FIG. 2) has a similar overall manufacturing cost as the typical stand-alone cordless and mobile phone systems shown in FIGS. 4 and 5, respectively.

Figure 6:
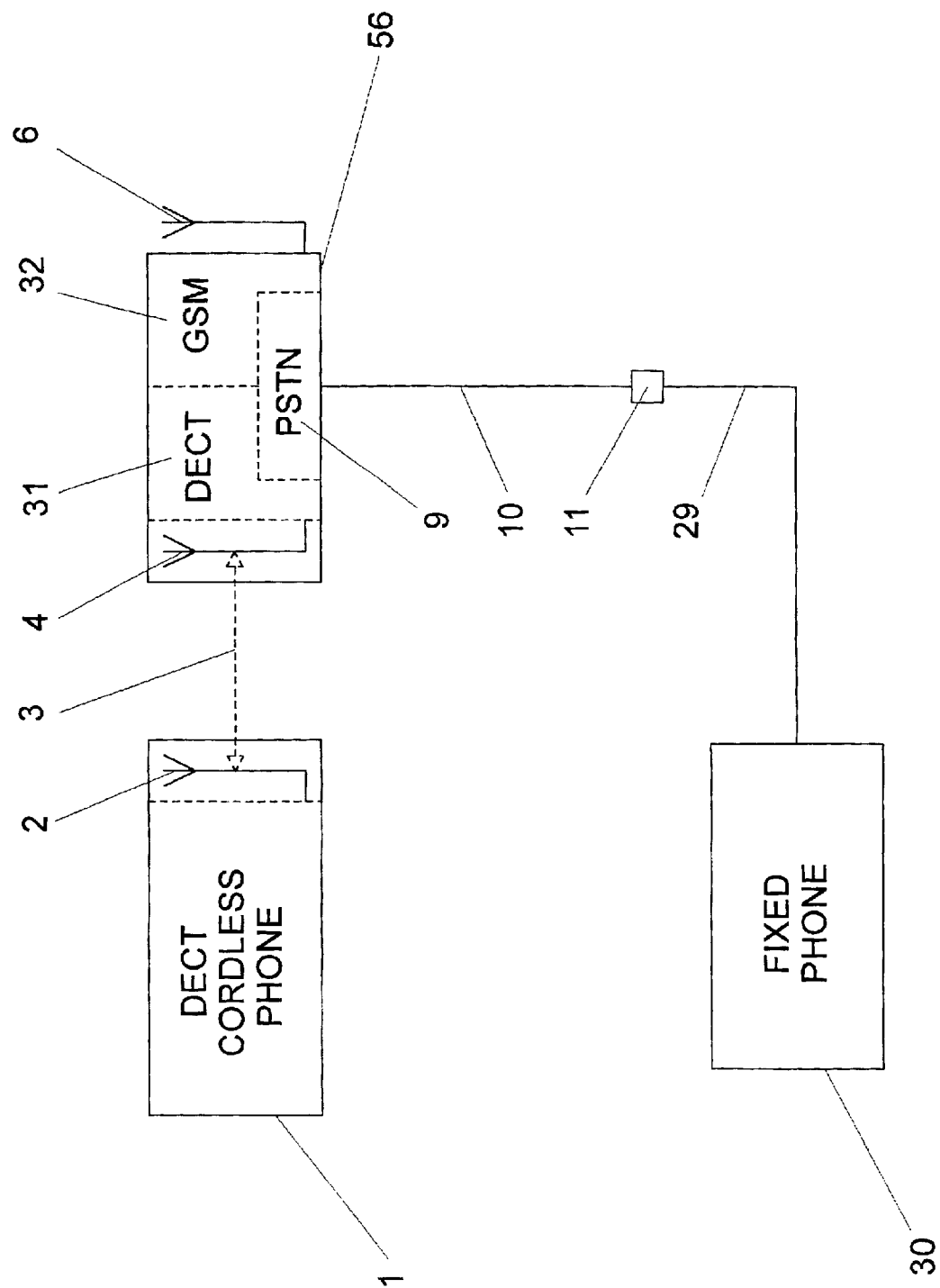
FIG. 6 shows the block diagram of a third embodiment of the present invention, where a PSTN (Public Switched Telephone Network) interface is contained within the mobile transponder unit and thus the latter can function as a portable cordless phone base station, the fixed phone being available for local-loop communication during periods when the transponder unit is disconnected.

Referring to FIG. 6, mobile transponder unit 56 not only contains the DECT and GSM transceivers 31 and 32, respectively, but also PSTN interface 9 allowing the transponder unit 56 to be physically connected to local-loop socket 11 via multi-core cable 10. In other words, the mobile transponder unit 56 can selectively function as a portable cordless phone base station thus providing means to communicate via a local-loop connection. For example, when within an area of poor reception for cellular networks, the cordless phone 1 can continue to be used. For periods when the mobile transponder unit 56 is disconnected from local-loop socket 11, a fixed phone 30 may be connected to socket 11 via cable 29.

As alternative, the transponder unit 56 could be provided with a connector suitable for a base station (not shown) having a multi-way docking station physically connected to a local-loop.

Referring again to FIG. 3 and FIG. 6, one or more of the described options (namely, the use of voicemail and/or call divert, or, parallel installation of a fixed phone) all help to ensure a caller does not obtain a continuous "ring-out" when the transponder units 5 or 56 are physically disconnected.

Figure 7:
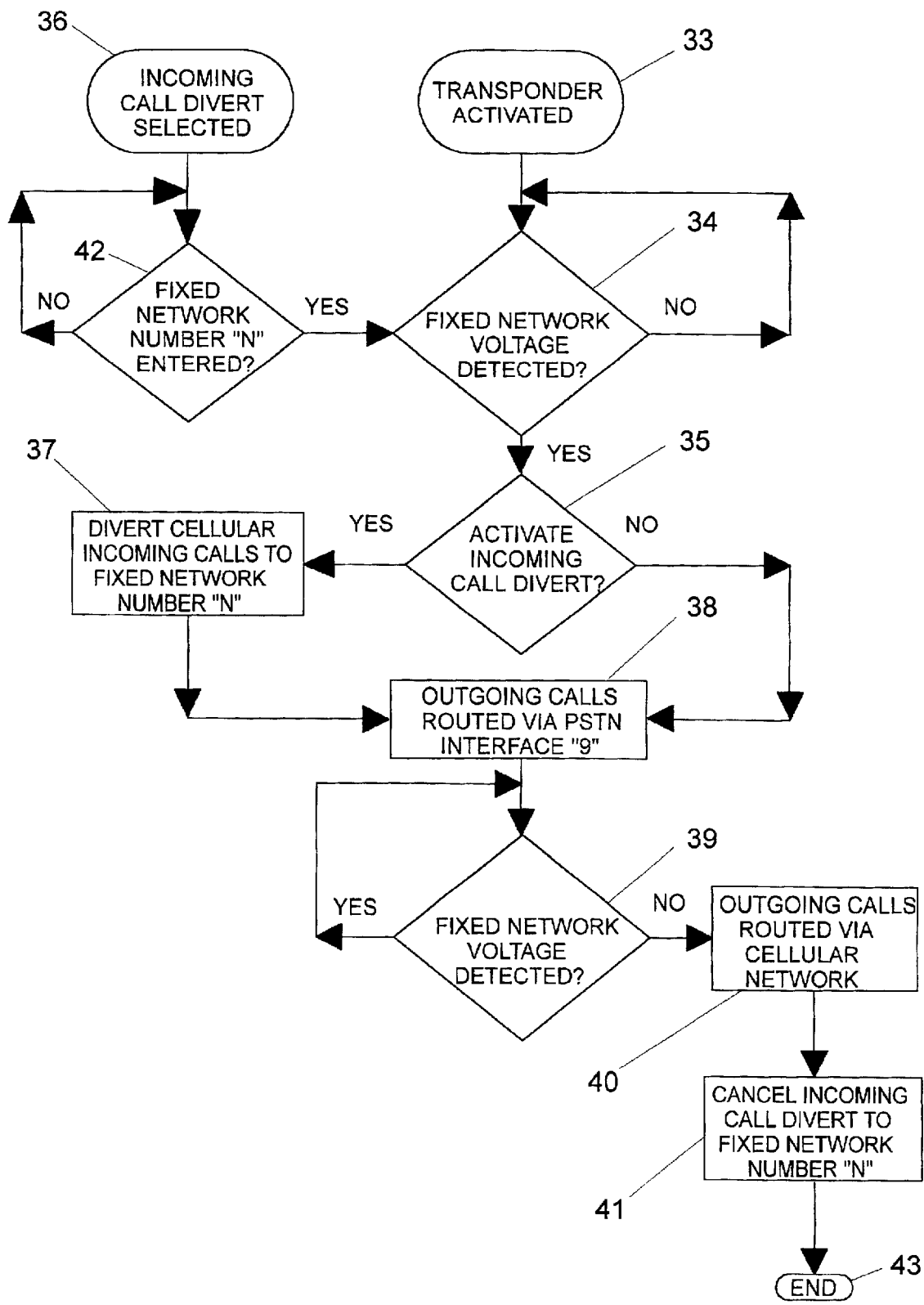
FIG. 7 shows an example flow chart of the automatic call diverts associated with the mobile transponder unit embodiments shown in FIG. 2, FIG. 3 or FIG. 6.

Referring to FIG. 7, when the transponder units 5 or 56 have been activated at 33, a decision is made at 34 whether a fixed network voltage has been detected and, if so, decision box 35 is activated; otherwise, a loop is entered. The decision box 35 determines whether incoming call divert has been selected by the user at 36, assuming it has subsequently been determined at decision box 42 that a fixed number "N" has been entered. If the result at decision box 35 is positive, the Cellular Network Control Centre is automatically advised at 37 (subject to cellular network provision) to divert any incoming calls made to the cellular network number of the mobile transponder units 5 or 56 to the fixed network telephone number "N" of the local-loop socket 11 and further outgoing calls are routed at 38 via PSTN interface 9. On the other hand, if the decision at decision box 35 is negative, 37 is bypassed. The decision box 39 then determines whether the fixed network voltage continues to be detected and, if so, a loop is entered. On the other hand, if the decision is negative at box 39, then all outgoing calls are routed via the cellular network at 40 and any cellular incoming call divert to fixed network number "N" is automatically cancelled at 41; the flow chart ending at 43.

Figure 8:
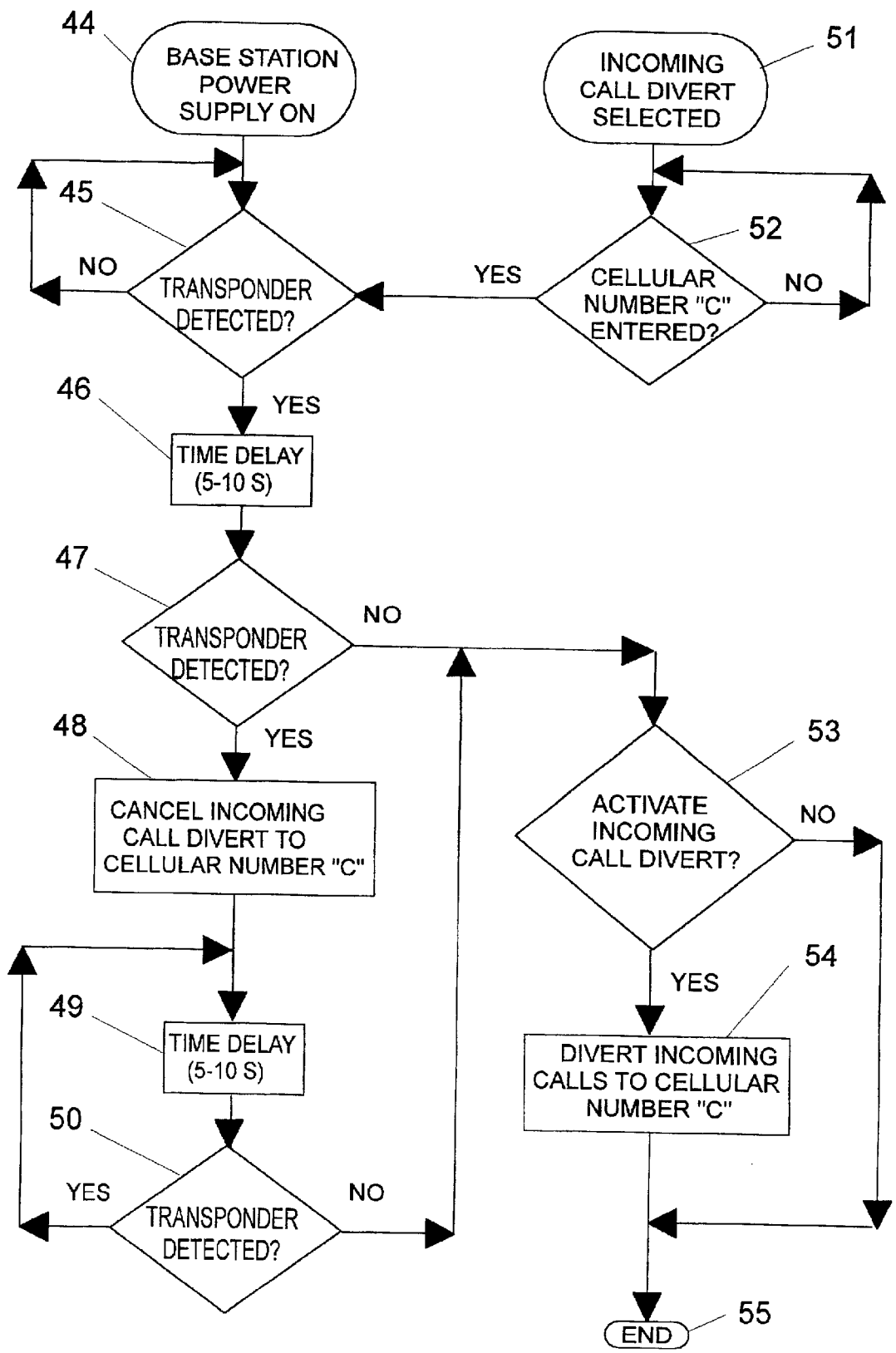
FIG. 8 shows an example flow chart of the automatic call diverts associated with the cordless phone base station embodiment shown in FIG. 3.

Referring to FIG. 8, when the power supply of base station 23 has been user connected at 44, decision box 45 continuously checks if the transponder unit has been inserted and enters a loop, if the answer is negative. On the other hand, if the answer is positive at box 45, then following the (anti-tamper) time delay at 46, decision box 47 re-checks the status of the transponder unit and, if the latter continues to be detected, any incoming call divert to the cellular number "C" of the mobile transponder unit is automatically cancelled at 48. Following the (anti-tamper) time delay 49, a further decision box 50 confirms transponder detection and then enters a loop. If the decision at box 50 (or, at box 47 is negative), decision box 53 determines whether incoming call divert has been selected by the user at 51, assuming it has previously been determined at decision box 52 that a cellular number "C" has been entered. If so, all incoming calls to the fixed network number of the local-loop socket 11 are automatically diverted at 54 (subject to fixed network provision) to the cellular network number "C" of the mobile transponder unit 5. On the other hand, if the decision at 53 is negative, then 54 is by-passed; the flow chart ending at 55.

Referring again to FIG. 7, the fixed network number "N" may be user pre-programmed into the mobile transponder units 5 or 56. Alternatively, in the case of the embodiment shown in FIG. 3, the number "N" may be user pre-programmed into the base station 23. In this case, when the transponder unit 5 is inserted into base station, the latter automatically communicates its fixed network telephone number "N" to the mobile transponder unit 5, say, by providing an appropriate signal via multi-way connector 12. In this way, the mobile transponder unit 5 may be utilised in conjunction with multiple base stations, for example, one base station might be located at the user's normal place of business and a second base station at the user's home. If incoming call divert 36 has been selected, then any call made direct to the cellular network number "C" of the mobile transponder unit 5 will automatically be diverted to the appropriate fixed network number "N".

Referring again to FIG. 8, if incoming call divert has been selected at 51, any calls made to base station number "N" when the transponder unit 5 is not detected by decision boxes 47 or 50 will be diverted to the cellular network number "C" (and subsequently to the appropriate fixed network number, if applicable). The cellular network number "C" may be user pre-programmed into the cordless phone base station 23. Alternatively, the mobile transponder unit 5 may automatically communicate the cellular network number "C" to base station 23 by, say, providing an appropriate signal via multi-way connector 12 (during a period when the transponder unit 5 is physically connected to base station 23).

The various embodiments of the multi-purpose mobile cordless phone so far described are shown as comprising a single cordless phone 1 and a single mobile transponder unit 5 or 56 but there may be multiple system components. For example, spare cordless phone handsets could be made available, providing no more than one is utilised at the same time. On the other hand, one "mobile" transponder unit could be permanently fitted to the user's car with another transponder unit carried in the user's briefcase as a mobile spare; the transponder units fitted with replicated SIM cards.

To avoid communication via more than one transponder unit at the same time, radio communication between the cordless phone 1 and each mobile transponder unit 5 or 56 could, for example, be at different frequencies; the user being able to select a transponder unit 5 or 56 for communication, via designated keys on cordless phone 1. The GSM transceiver contained within transponder units 5 or 56 would remain dormant unless a "wake-up" signal was received by the transponder unit from cordless phone 1. The transponder unit 5 or 56 might be fitted with an LED, which would flash when the transponder unit had been activated.

Referring again to FIGS. 3 and 8, in the case of multiple transponder units being made available to the user, the latter would be detected by the base station 23 by an appropriate signal passed by the transponder unit 5 to the base station 23, for example, via multi-way connector 12. In other words, activation of microswitch 15 would not in itself be sufficient in this case, given that the user could leave a dormant transponder unit 5 inserted in base station 23.

Figure 9:
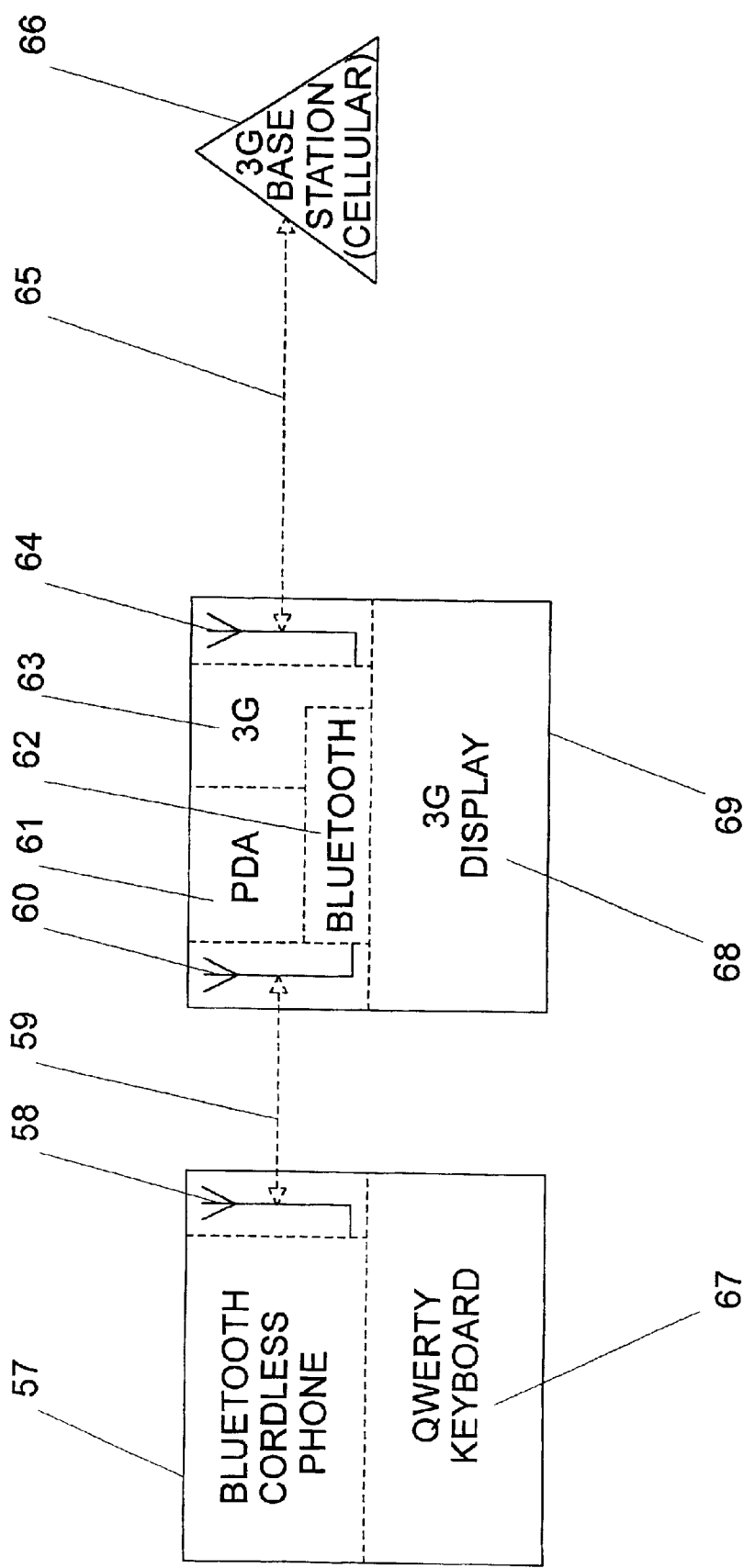
FIG. 9 shows the block diagram of a fourth embodiment of the present invention, when the cordless phone is communicating via a base station within a 3G cellular network, the transponder unit also incorporating PDA electronics and a display screen, whereas the cordless phone contains a QWERTY keyboard.

Referring to FIG. 9, Bluetooth cordless phone 57 communicates signals 59 via antennae 58 and 60 with the mobile transponder unit 69 containing Bluetooth transceiver 62. The mobile transponder unit 69 also houses a 3G transceiver 63, which communicates signals 65 via internal antenna 64 with 3G base station 66 within a Third Generation (3G) cellular network. Due to the more complex visual image signals available via the latter, the mobile transponder unit 69 houses an enhanced screen 68 suitable for displaying 3G images.

In addition, mobile transponder unit 69 integrates PDA (Personal Digital Assistant) electronics 61 suitable for providing the functionality associated with the more advanced types of PDA. The display screen for the latter is also provided by item 68 within mobile transponder unit 69; whereas, a QWERTY alphanumeric keyboard 67 is housed within cordless phone 57, the latter communicating instructions to the PDA electronics 61 via Bluetooth signals 59. The QWERTY keyboard 67 is also useful for composing mobile text messages to be sent via SMS or WAP mail via 3G transceiver 63.

Figure 10:
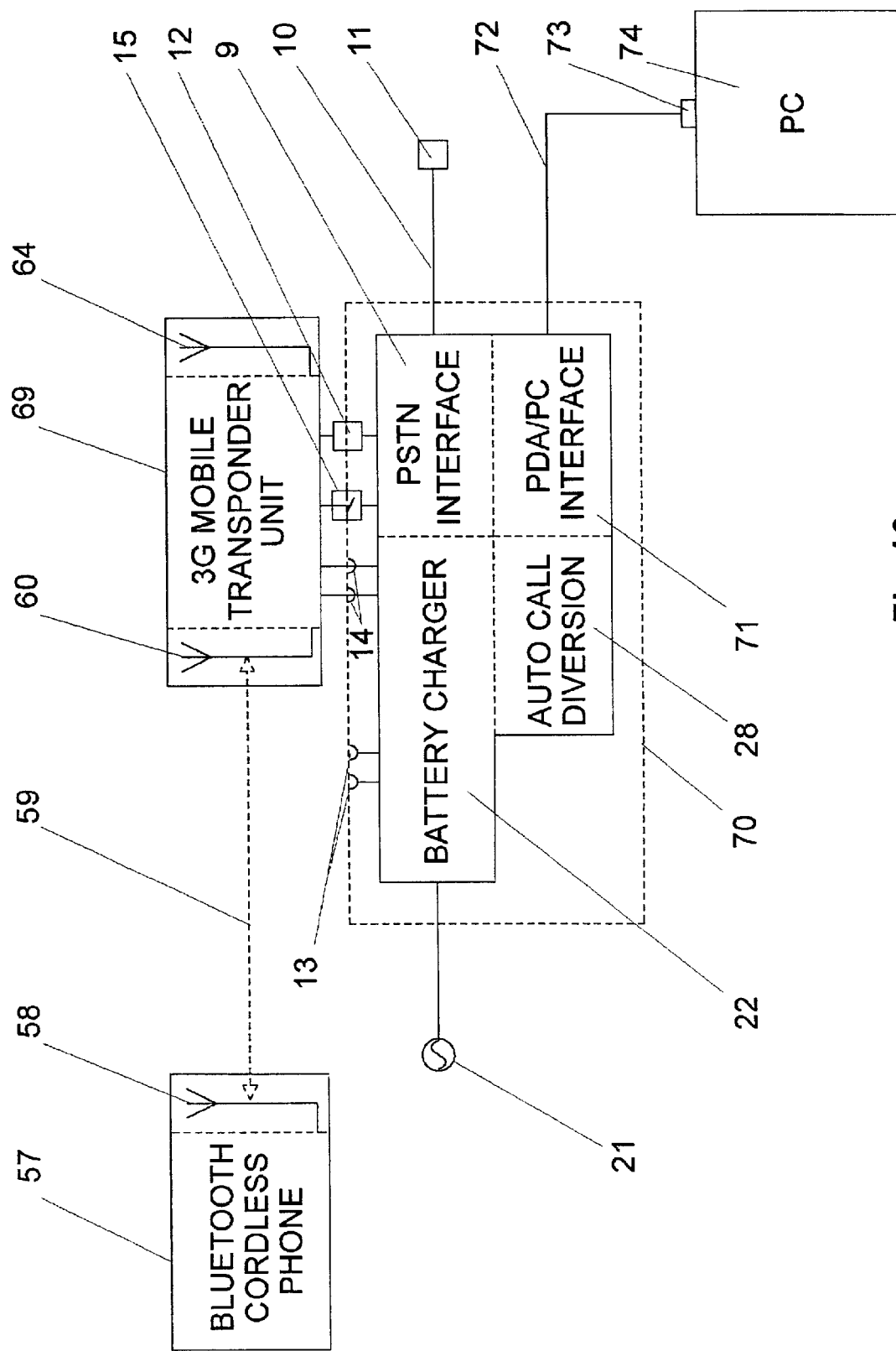
FIG. 10 shows the block diagram of a cordless phone base station for the same embodiment as shown in FIG. 9, when the cordless phone is physically connected to the base station which incorporates a PDA/PC interface for data synchronisation purposes.

Referring to FIG. 10, Bluetooth cordless phone 57 is able to communicate via a fixed telephone network when 3G mobile transponder unit 69 is physically connected to a base station 70. As well as battery charger 22, auto call diversion 28 and PSTN interface 9, the base station 70 also incorporates a PDA/PC interface 71 allowing synchronisation of data between the PDA electronics 61 (FIG. 9) and a desktop Personal Computer (PC) 74, connected via cable 72 and computer port 73.

Referring both to FIG. 9 and FIG. 10, when mobile transponder unit 69 is able to communicate via local-loop socket 11, assuming suitable web browser software has been installed, the PDA electronics 61 can be used to provide full Internet access, images being displayed on screen 68. In this mode, QWERTY keyboard 67 may be used to compose e-mail messages for transmission via fixed Internet or ISP mail via PSTN interface 9.

Figure 12:
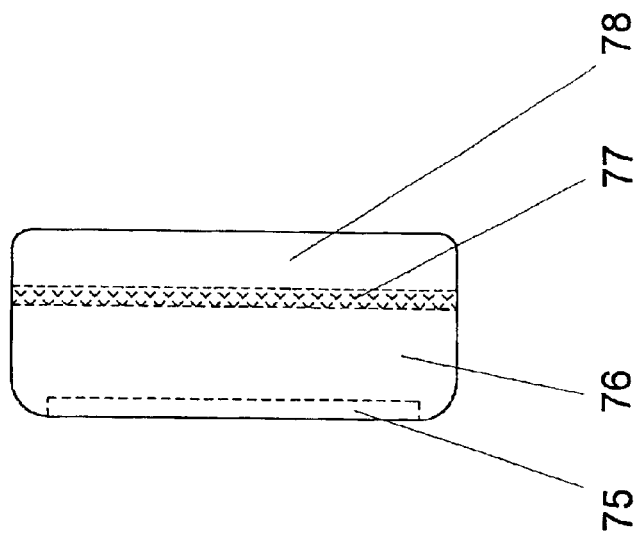
FIG. 12 is an end view of the mobile transponder unit shown in FIG. 11 showing the personal radiation shield.
Figure 11:
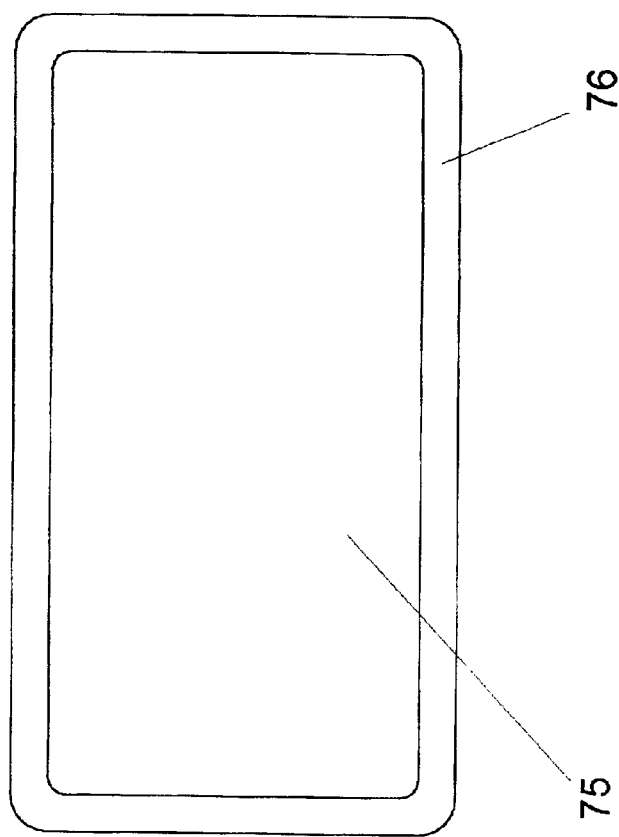
FIG. 11 shows a plan view of the mobile transponder unit for the same embodiment as FIG. 9, indicating the visual image display screen which is significantly larger than normally available for a cordless phone.

Referring to FIG. 11 and FIG. 12, the mobile transponder case 76 houses image display screen 75 making use of the entire space available on the large front outer side of plastic case 76. As well as the various electronic items 61, 62 and 63, antenna 60 and 64 (all shown in FIG. 9), case 76 internally houses personal radiation shield 77 comprising a suitable wire mesh based on the "Faraday Cage" principle. Radiation shield 77 is located towards the back side of case 76 and, if any radiation from the higher power antenna 64 passes through shield 77, some further adsorption will be provided by rechargeable battery 78. It is self evident from this arrangement that, to minimise the amount of radiation entering the user's body (for example, if the transponder unit is held in close proximity to the later, say, within a tight fitting pocket or belt case), the front display screen 75 side of the transponder should be facing away from the user's body.

When it is required to view the display screen 75, the mobile transponder unit 69 may be inserted within cordless phone base station 70, the latter (not shown) designed to hold display screen 75 at an ergonomically correct angle to the vertical. For mobile use, plastic case 76 might incorporate a "fold-away" angled support bracket (not shown); alternatively, the transponder unit 69 can simply be laid flat on a suitable surface.

Figure 13:
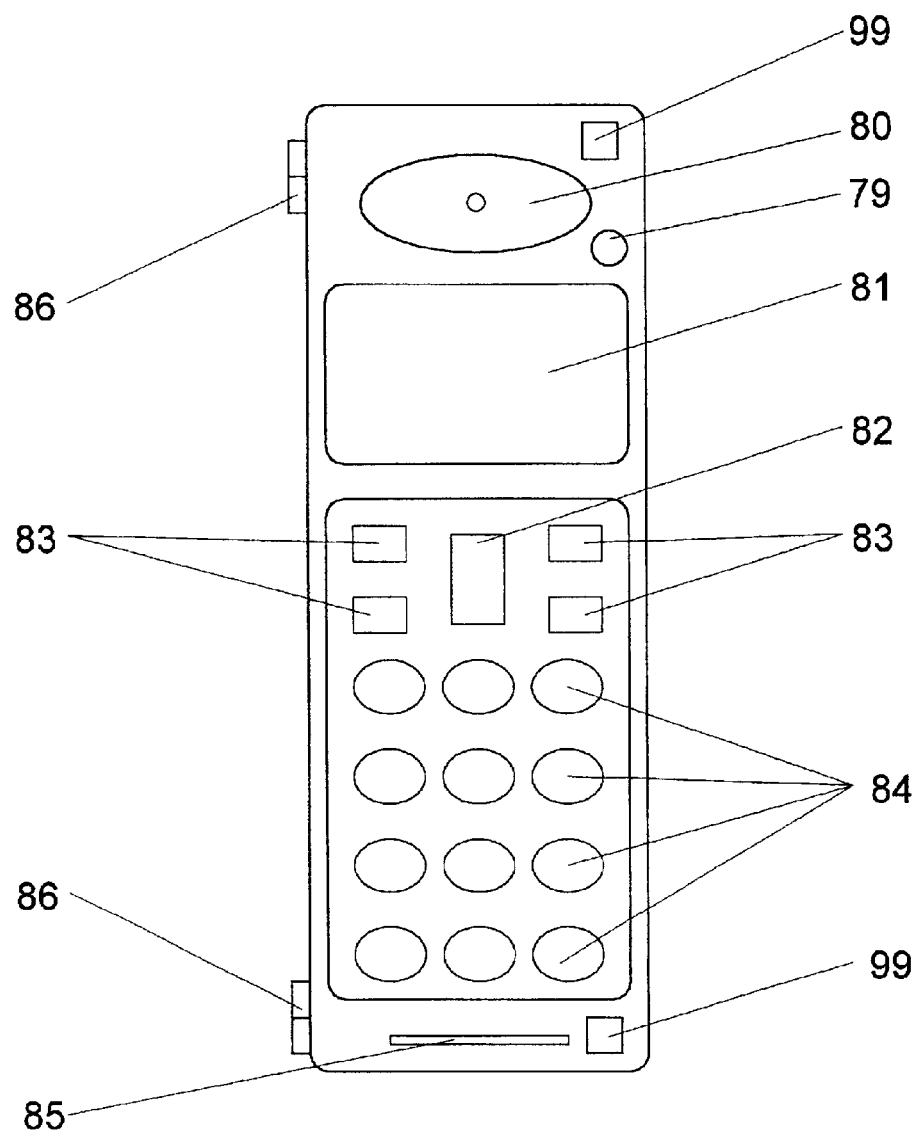
FIG. 13 shows a plan view of the cordless phone for the same embodiment as FIG. 9, which externally has a small display screen and keypad area, similar to a typical mobile phone of the handheld type.
Figure 14:
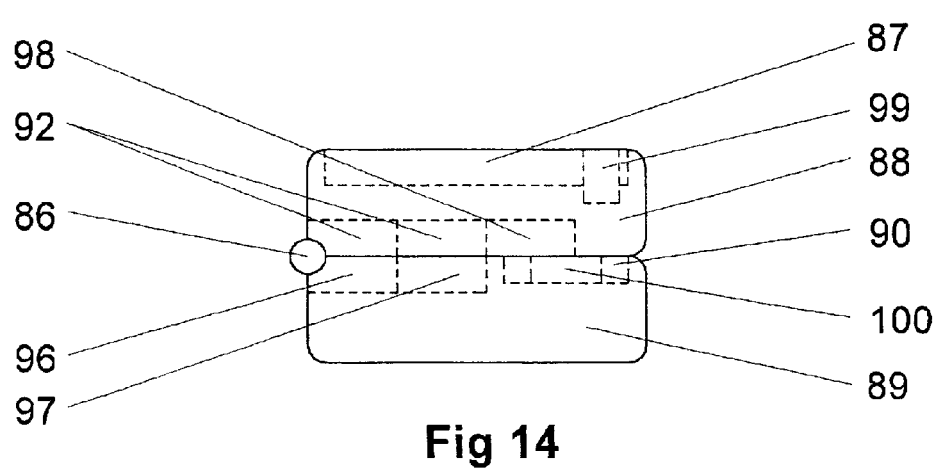
FIG. 14 is an end view of the cordless phone shown in FIG. 13, when the two main body components, joined together by hinges, are in the "closed" position.

Referring to FIG. 13 and FIG. 14, the cordless phone shown comprises two main body components 88 and 89, joined together via hinges 86. On one side of casing 88 (the top side of the phone) are located the usual mobile phone user items, namely, display screen 81, numeric keypad 84 (the push-button keys are 3 columns wide ×4 rows deep), screen scrolling key 82 plus ancillary keys 83, on/off switch 79, earpiece 80 and microphone 85. Due to the need to accommodate these various items, the keypad 84 area has to be limited to less than 50% of the available space.

Figure 15:
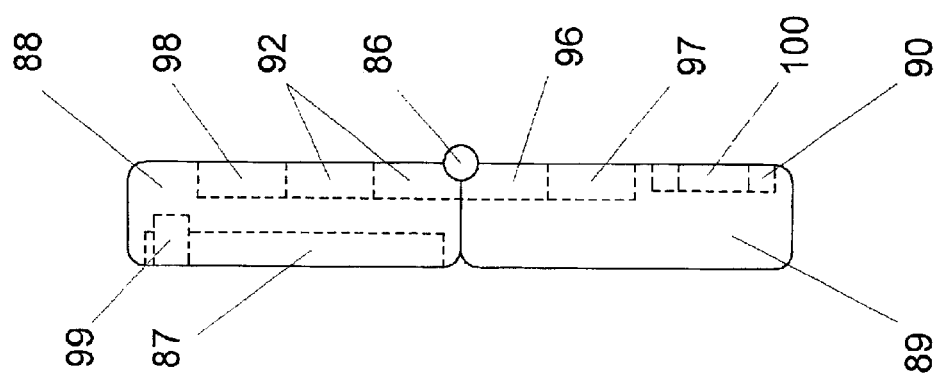
FIG. 15 is an end view of the cordless phone shown in FIG. 13, when the two main body components, joined together by hinges, are in the "open" position.

Referring to FIG. 14 and FIG. 15, the keys 82, 83 and keypad 84 (shown in FIG. 13) are all situated within recessed area 87 so that when the two main body components 88 and 89 are in the "open" position (as shown in FIG. 15), they are able to rest evenly on a flat surface. As alternative, if required by the user, a pair of shaped plastic lugs (not shown) can be inserted into the square recesses 99 within body component 88 so that the "fold-out" keyboard (described later, referring to FIG. 16) will be held at an inclined angle.

Figure 16:
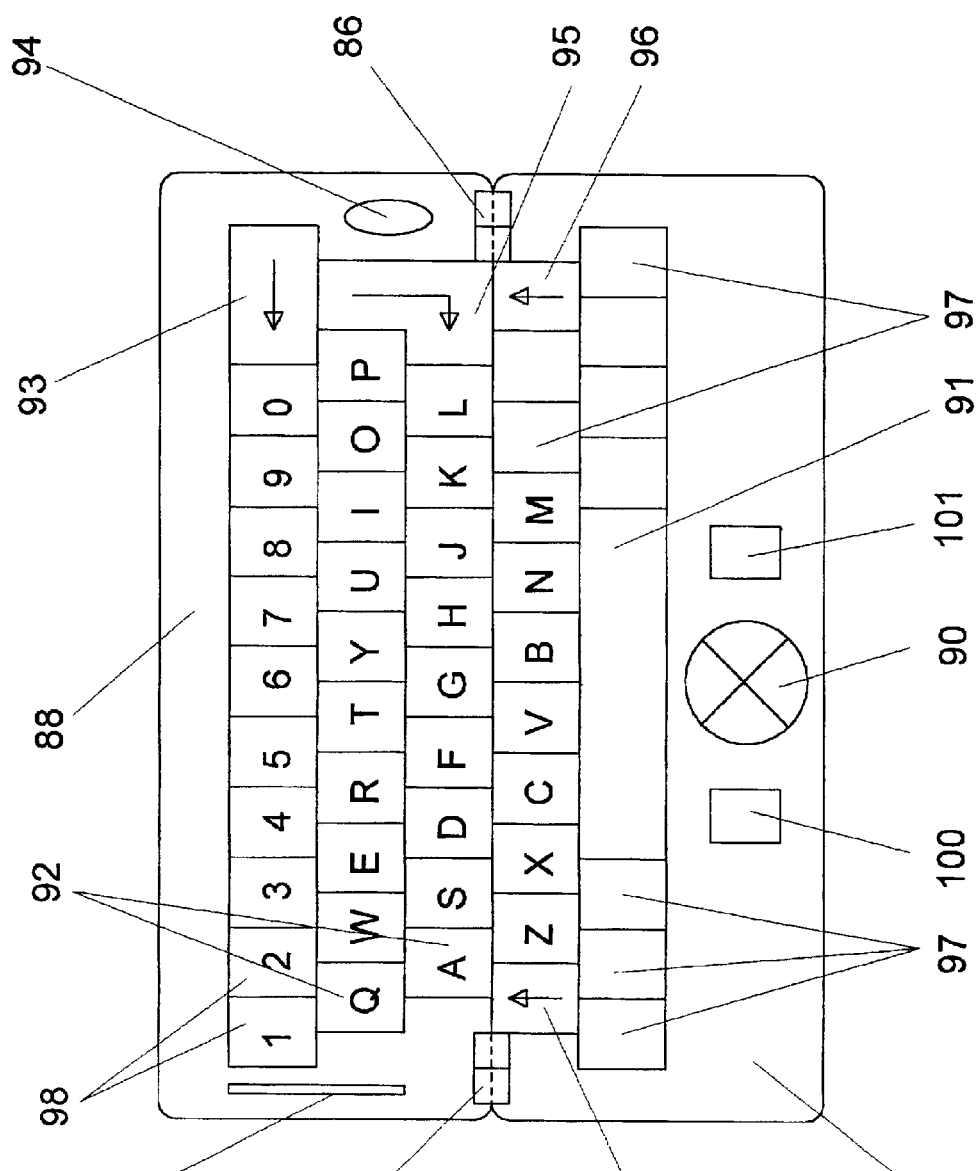
FIG. 16 is a plan view of FIG. 15, showing the "fold-out" QWERTY alphanumeric keyboard.

Referring to FIG. 16, the keyboard shown comprises a full alphabet of keys 92 (arranged in QWERTY layout), numeric keys 98, back-space key 93, return key 95, shift keys 96, plus ancillary keys 97. In addition, the layout includes "four-way" screen navigation key 90 along with associated left-hand and right-hand "click" keys 100 and 101, respectively. Due to the "fold-out" keyboard being split along a longitudinal line (where body components 88 and 89 are joined by hinges 86), space has been made available for the various forgoing features. In addition, the keyboard area includes microphone 85 and speaker 94.

For the keyboard layout shown in FIG. 16, the hinged longitudinal line splits the keyboard asymmetrically. However, if the row of numeric keys 98 were not included, then the line would split the keyboard symmetrically.

Referring again to FIG. 14 and FIG. 15, in order for the "fold-out" keyboard (shown in FIG. 16) to be evenly "closed", all of the keys 92 (plus 95), 96, 97, 90 and 100 (plus 101) are fully recessed with the main body components (items 88 and 89) of the cordless phone.

Referring again to FIG. 13 and FIG. 14, to prevent the body components (items 88 and 89) inadvertently opening, for example, hinges 86 might be spring-loaded; alternatively, a suitable closure latch (not shown) may be provided.

Referring to FIG. 14, FIG. 15 and FIG. 16, the various keys adjacent to the line of the hinges 86 are protected externally by thin plastic edge mouldings incorporated within body components 88 and 89, respectively. Body components 88 and 89 are electrically interconnected by wires (not shown) passing via hinges 86.

Referring again to FIG. 11, FIG. 13 and FIG. 16, the keypad shown in FIG. 13 is used in conjunction with integral display screen 81 (in a similar way to a normal cordless phone); whereas, the keyboard shown in FIG. 16 is used in conjunction with the display screen 75 shown in FIG. 11.

Figure 17:
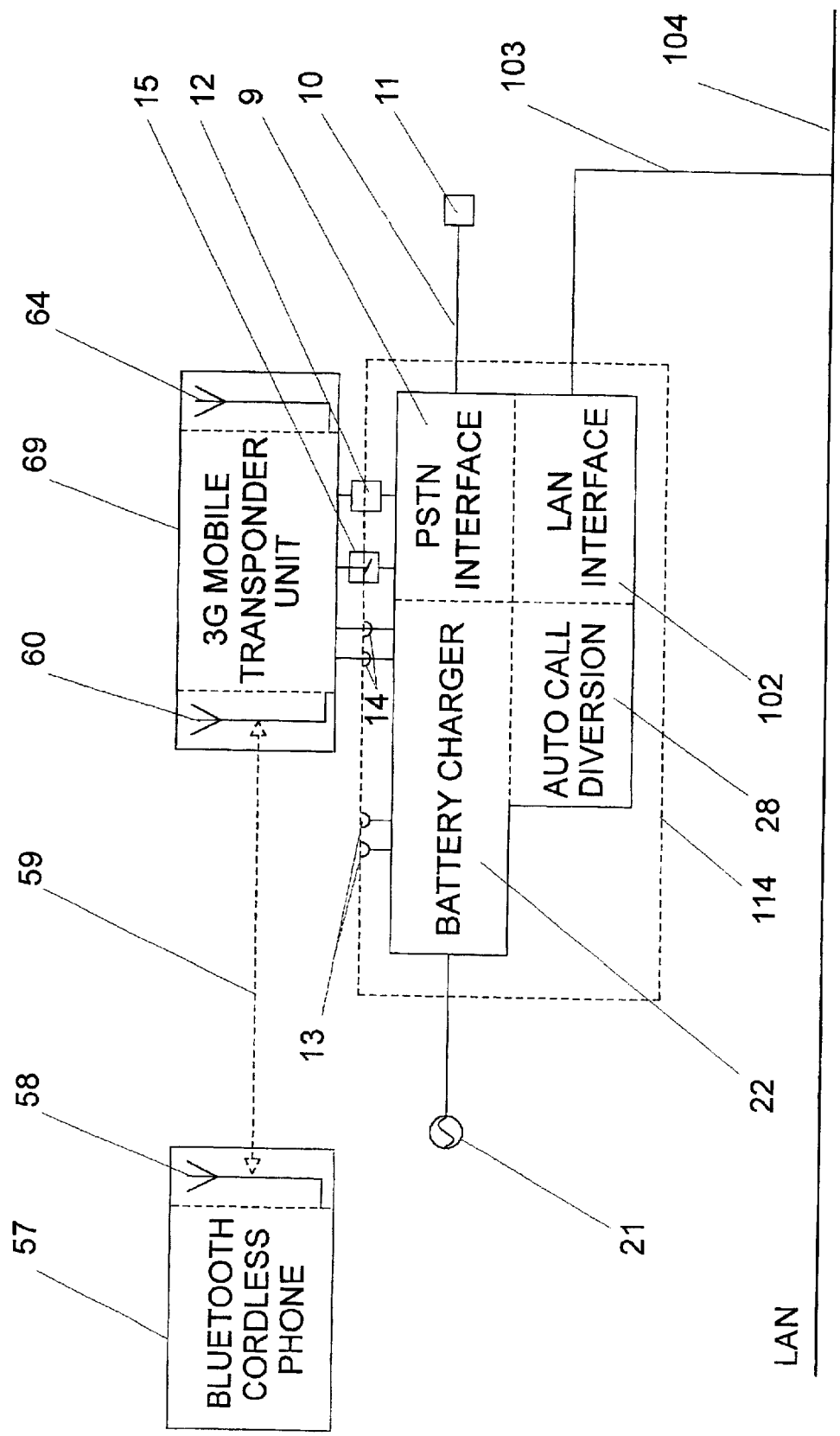
FIG. 17 shows the block diagram of a cordless phone base station for the same embodiment as shown in FIG. 9, when the cordless phone is physically connected to the base station which incorporates a LAN interface.

Referring to FIG. 17, Bluetooth cordless phone 57 is able to communicate via a fixed telephone network when 3G mobile transponder unit 69 is physically connected to a base station 114. As well as battery charger 22, auto call diversion 28 and PSTN interface 9, the cordless phone base station 114 also incorporates a LAN interface 102 allowing the 3G mobile transponder unit 69 to selectively communicate via base station 114 and cable 103 with LAN (Local Area Network) 104. Under the latter circumstances, PDA electronics 61 plus QWERTY keyboard 67 and 3G display 68 (shown in FIG. 9) effectively form the main components of a workstation client within the LAN network 104.

Figure 18:
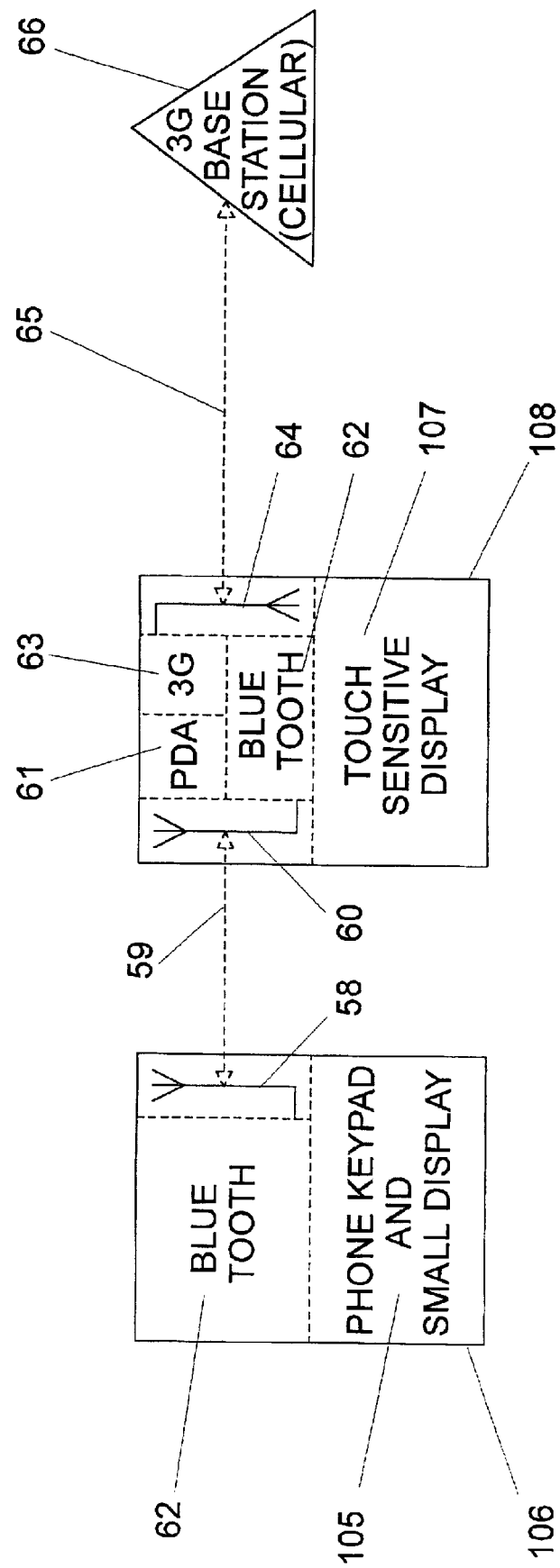
FIG. 18 shows the block diagram of a fifth embodiment of the present invention, when the cordless phone is communicating via a base station within a 3G cellular network, the cordless phone having a typical phone keypad and small display screen and is linked by Bluetooth radio signals with a mobile transponder unit having a touch sensitive display.

Referring to FIG. 18, Bluetooth cordless phone 106 comprises the usual phone keypad and small display screen 105 and communicates signals 59 via internal antenna 58 with mobile transponder unit 108 having internal antenna 60 and Bluetooth transceiver 62. The transponder 108 also contains 3G transceiver 63 and internal antenna 64 allowing 3G signals 65 to be communicated with base station 66 within a 3G cellular network. As well as PDA electronics 61, transponder unit 108 also houses touch sensitive display screen 107.

Figure 19:
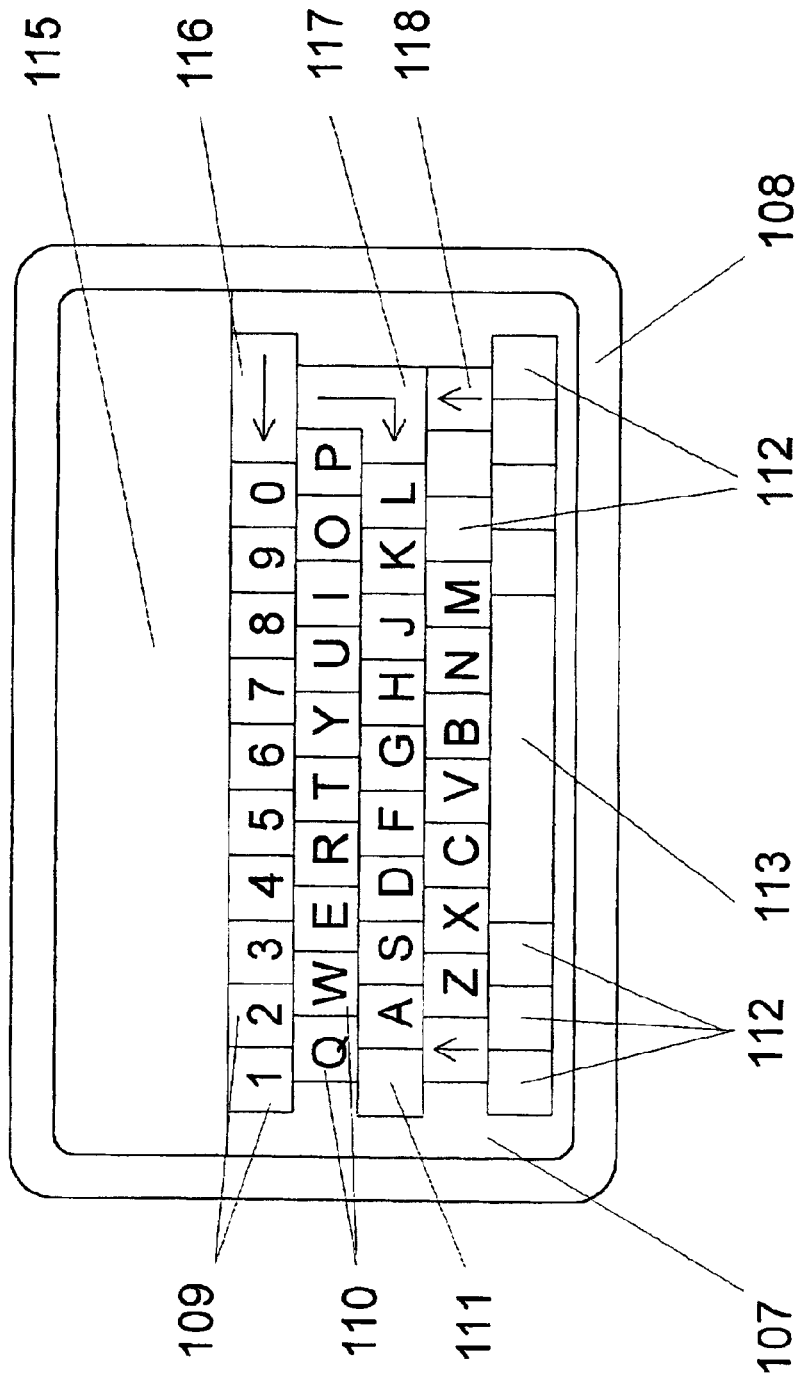
FIG. 19 is a plan view of the mobile transponder unit for the same embodiment as FIG. 18 when the touch-sensitive QWERTY alphanumeric keyboard has been user selected.

Referring to FIG. 19, touch sensitive display screen 107 housed on one flat side of transponder unit 108 is shown when the QWERTY alphanumeric keyboard has been user selected. The touch sensitive keyboard includes a full alphabet of keys 110, numeric keys 109, back-space key 116, return key 117, shift keys 118, cap lock key 111, spacer bar 113, plus various ancillary keys 112. The latter take up the bottom two-thirds of the available screen space with the top third 115 being available for text display purposes. Due to the relatively small size of the displayed touch sensitive keys, it is preferable to use a suitable hand-held data entry "pen" (not shown) having a small diameter flat end to activate each key in turn.

Figure 20:
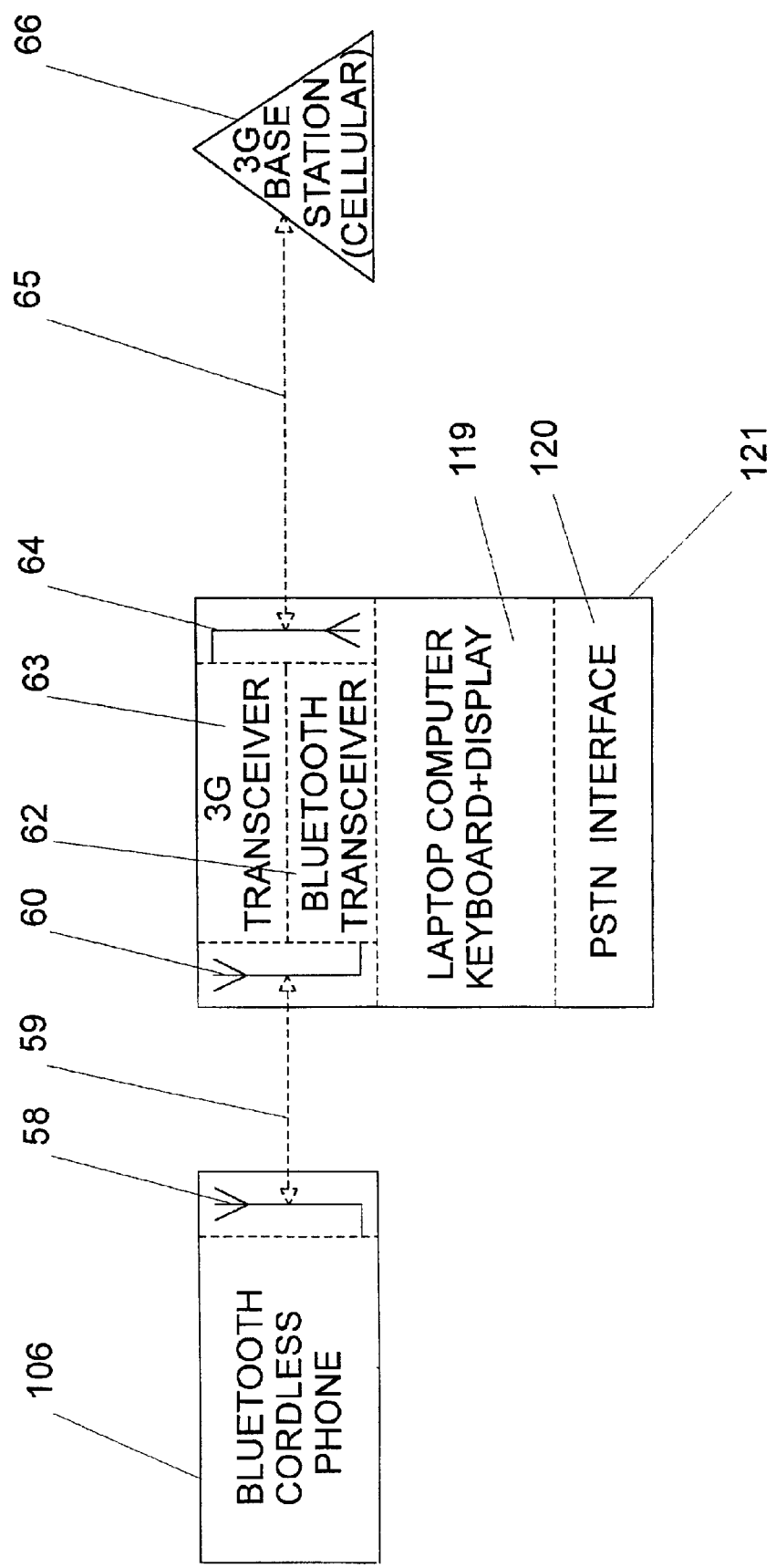
FIG. 20 shows the block diagram of a sixth embodiment of the present invention, when the cordless phone is communicating via a base station within a 3G cellular network, the mobile transponder unit being incorporated within a laptop computer having a PSTN interface.

Referring to FIG. 20, Bluetooth cordless phone 106 is shown communicating signals 59 via antenna 58 and 60 with Bluetooth transceiver 62 connected to 3G transceiver 63 communicating signals 65 with base station 66 within a 3G cellular network. The Bluetooth transceiver 62 and 3G transceiver 63 plus associated antenna 60 and 64, respectively, provide the main components of a mobile transponder unit housed within laptop computer 121 having its own keyboard and display 119. In addition laptop computer 121 houses PSTN interface 120 which can selectively be connected to a local-loop socket (not shown) within a fixed telephone network.

In the embodiment shown in FIG. 20, the main mobile transponder components 62 and 63 are powered by the rechargeable battery (not shown) of laptop computer 121 and are integrally fitted by the computer manufacturer. Alternatively, a mobile transponder unit could be provided as an optional accessory item for fitment to laptop computer 121, either internally within a suitable module bay; or externally, as a plug-in module or connected via a suitable cable.

In a further version of the embodiment shown in FIG. 20, the laptop computer 121 could be replaced by a handheld computer of the "Psion" type having a smaller keyboard and display than a laptop computer. In addition to the foregoing, the term "notebook computer" is also sometimes used instead of the term "laptop computer" and thus the generic term "portable computer" is used elsewhere within the description as well in the following claims to mean any of the following: a laptop computer, a notebook computer, or, a handheld computer of the "Psion" type.

Within the foregoing description, there are various base stations shown containing a PSTN (Public Switched Telephone Network) interface for passing signals via a local-loop connection of a fixed telephone network. The most common type of PSTN interface is suitable for POTS, providing a "Plain Old Telephone Service" or analogue voice channel. However, it may be required to communicate data and/or visual image signals via the fixed telephone network, in which case, a suitable PSTN interface would contain a modem card or an ISDN card, depending on the type of local-loop service available. In some cases, it may be required to connect to a LAN (Local Area Network) and again a suitable interface card can be fitted, for example, as shown in FIG. 17. In the future, in addition to digital data and/or visual image signals, there is likely to be a growing requirement for a PSTN interface suitable for providing Internet Telephony, also referred to as VoIP (Voice over Internet Protocol).

Throughout the foregoing description and the following claims, the phrase "fixed telephone network" is used as a generic term for any non-cellular phone network and the latter can thus include both public (PSTN) and private networks. The phrase "local-loop connection" is normally understood to mean a landline connection between the customer and the local PSTN exchange and is sometimes alternatively called a Customer Access Connection (CAN), particularly in North America. In addition to use of the traditional twisted pair of copper wires for a local-loop connection, the latter may also be provided via a Cable TV (CATV) network, or, via fixed radio access technology (Wireless Access Loop). The use of an electrical power supply cable for local-loop has also been demonstrated using Power Line Communication (PLC) technologies.

I claim the following:

1. A multi-purpose mobile cordless phone system capable of communicating voice/sound, data and/or visual image signals selectively either with a local base station within a cellular phone network or with a local-loop connection within a fixed telephone network; the system comprising a cordless phone which may communicate with one or more mobile transponder units having the same cellular network phone number, only one transponder unit being active at a given time; all signals are communicated via the active mobile transponder unit, communication with a local-loop being enabled when the active mobile transponder unit is physically connected to the latter either via a docking station within a suitable base station or via a direct cable link when the active mobile transponder unit contains a suitable fixed network interface.

2. A multi-purpose mobile cordless phone system capable of communicating voice/sound, data and/or visual image signals selectively either with a local base station within a cellular phone network or with a local-loop connection within a fixed telephone network; the system comprising a cordless phone which may communicate with one or more mobile transponder units having the same cellular network phone number, only one transponder unit being active at a given time; all signals are communicated via the active mobile transponder unit, communication with a local-loop being enabled when the active mobile transponder unit is physically connected to the latter either via a docking station within a suitable base station or via a direct cable link when the active mobile transponder unit contains a suitable fixed network interface; and the active mobile transponder unit incorporates means to automatically detect whether it is physically connected to a local-loop connection within a fixed telephone network and, if so, outgoing calls may be routed via the local-loop; when the active mobile transponder unit detects it is connected to a fixed telephone network, it may automatically advise the Cellular Network Control Centre to divert any incoming calls made to the cellular phone number of the mobile transponder unit via the fixed network telephone number of the local-loop connection, the base station automatically providing a signal to the mobile transponder unit advising the fixed network telephone number of the local-loop.

3. A multi-purpose mobile cordless phone system according to claim 2, wherein the active mobile transponder unit can detect whether its is physically connected to a local-loop connection by sensing the fixed telephone network system voltage.

4. A multi-purpose mobile cordless phone system capable of communicating voice/sound, data and/or visual image signals selectively either with a local base station within a cellular phone network or with a local-loop connection within a fixed telephone network; the system comprising a cordless phone which may communicate with one or more mobile transponder units having the same cellular network phone number, only one transponder unit being active at a given time; all signals are communicated via the active mobile transponder unit, communication with a local-loop being enabled when the active mobile transponder unit is physically connected to the latter either via a docking station within a suitable base station or via a direct cable link when the active mobile transponder unit contains a suitable fixed network interface; and at least one base station incorporates means to automatically detect whether the active mobile transponder unit has been inserted; during periods when a mobile transponder unit has not been inserted into the base station or if the inserted transponder unit is not active, the base station may automatically divert any incoming calls made to the fixed network number of the connected local-loop via the cellular network phone number of the mobile transponder unit, the transponder unit automatically providing a signal to the base station advising the cellular network phone number of the mobile transponder unit when the latter has been inserted into the base station.

5. A multi-purpose mobile cordless phone system according to claim 2 or 4 having multiple mobile transponder units, wherein to avoid communication via more than one transponder unit at the same time, radio communication between the cordless phone and each of the mobile transponder units is user selectable.

6. A multi-purpose mobile cordless phone system capable of communicating voice/sound, data and/or visual image signals selectively either with a local base station within a cellular phone network or with a local-loop connection within a fixed telephone network; the system comprising a cordless phone which may communicate with one or more mobile transponder units having the same cellular network phone number, only one transponder unit being active at a given time; all signals are communicated via the active mobile transponder unit, communication with a local-loop being enabled when the active mobile transponder unit is physically connected to the latter either vial docking station within a suitable base station or via a direct cable link when the active mobile transponder unit contains a suitable fixed network interface; and at least one base station incorporates means for simultaneously re-charging a mobile transponder unit and a cordless phone.

7. A multi-purpose mobile cordless phone system capable of communicating at least one of voice/sound, data and visual image signals with a local base station within a cellular phone network and with a local-loop connection within a fixed telephone network; the system essentially comprises a cordless phone and a dedicated mobile transponder unit, both of which are compact portable devices; the cordless phone can selectively communicate via the mobile transponder unit with one of the cellular phone network and the fixed telephone network; it being necessary for the mobile transponder unit to be physically connected to the fixed telephone network when the system communicates with the latter but, when the system communicates with the cellular phone network, all communication is via radio links.

8. A multi-purpose mobile cordless phone system according to claim 7, wherein the mobile transponder unit is physically connected to the fixed telephone network via a docking station within a suitable base station, the docking station incorporating a microswitch in order to automatically detect whether the mobile transponder unit has been inserted, the detection circuit associated with the microswitch having a time delay so that it does not respond to short period tampering with the microswitch.

* * * * *